United States Patent
Sherwin et al.

Patent Number: 5,709,281
Date of Patent: Jan. 20, 1998

[54] METHOD AND APPARATUS FOR ADJUSTING STEERING FEEL

[75] Inventors: Kenneth A. Sherwin; Daniel E. Williams, both of West Lafayette, Ind.

[73] Assignee: TRW Inc., Lyndhurst, Ohio

[21] Appl. No.: 528,425

[22] Filed: Sep. 14, 1995

[51] Int. Cl.$^6$ ............... B60K 28/02; B60K 28/10; B62D 6/00

[52] U.S. Cl. ............... 180/272; 180/280; 180/169; 180/446; 340/576; 342/71

[58] Field of Search ............... 180/271, 272, 180/274, 280, 282, 167, 169, 407, 446, 401; 340/575, 576, 425.5, 435, 436, 437, 459; 342/70, 71

[56] References Cited

U.S. PATENT DOCUMENTS

| | | | |
|---|---|---|---|
| 3,697,985 | 10/1972 | Faris et al. | 342/71 X |
| 3,882,953 | 5/1975 | Maisch | 180/422 |
| 3,958,656 | 5/1976 | Niemann | 180/402 |
| 4,386,674 | 6/1983 | Sugata | 180/422 |
| 4,592,565 | 6/1986 | Eagle | 180/282 X |
| 4,830,127 | 5/1989 | Ito et al. | 180/446 |
| 4,834,203 | 5/1989 | Takahashi et al. | 180/446 |
| 4,834,205 | 5/1989 | Mizuno et al. | 180/422 |
| 4,837,692 | 6/1989 | Shimizu | 180/446 X |
| 4,875,540 | 10/1989 | Oshita et al. | 180/446 |
| 4,878,557 | 11/1989 | Shibahata et al. | 180/415 |
| 4,909,343 | 3/1990 | Mouri et al. | 180/422 |
| 4,951,207 | 8/1990 | Furukawa et al. | 180/446 X |
| 4,967,865 | 11/1990 | Schindler | 180/408 |
| 4,992,944 | 2/1991 | Noto et al. | 180/446 X |
| 4,998,593 | 3/1991 | Karnopp et al. | 180/408 |
| 5,008,678 | 4/1991 | Herman | 342/70 |
| 5,032,821 | 7/1991 | Domanico et al. | 180/432 X |
| 5,072,803 | 12/1991 | Kilian et al. | 180/422 |
| 5,141,069 | 8/1992 | Yasui | 180/422 |
| 5,156,229 | 10/1992 | Yasui et al. | 180/422 |
| 5,159,553 | 10/1992 | Karnopp et al. | 180/422 X |
| 5,198,981 | 3/1993 | Collier-Hallman et al. | 180/446 X |
| 5,230,396 | 7/1993 | Yasui | 180/422 |
| 5,236,056 | 8/1993 | Pfeffer et al. | 180/446 |
| 5,257,828 | 11/1993 | Miller et al. | 180/446 |
| 5,325,096 | 6/1994 | Pakett | 342/70 |
| 5,347,458 | 9/1994 | Serizawa et al. | 180/402 X |
| 5,467,283 | 11/1995 | Butsuen et al. | 180/169 X |
| 5,517,196 | 5/1996 | Pakett et al. | 342/70 |
| 5,572,449 | 11/1996 | Tang et al. | 180/271 X |
| 5,574,641 | 11/1996 | Kawakami et al. | 180/280 X |
| 5,583,495 | 12/1996 | Ben Lulu | 180/170 X |

FOREIGN PATENT DOCUMENTS

| 718 173 | 6/1996 | European Pat. Off. |
| 96-175413 | 7/1996 | Japan. |

*Primary Examiner*—Kevin Hurley
*Attorney, Agent, or Firm*—Tarolli, Sundheim, Covell, Tummino & Szabo

[57] ABSTRACT

A vehicle steering apparatus (20) includes a steering feel motor (50). A torque sensor (58) senses steering torque applied by a vehicle driver. A sensor (24) senses a characteristic of a driver and provides a signal indicative thereof. A hazard sensor (44) senses a potential steering hazard. The steering feel motor is controlled in response to the sensed driver characteristic and to any sensed potential steering hazard. Either open-loop or closed-loop control is provided for controlling the feel motor in response to sensed static and dynamic forces.

11 Claims, 5 Drawing Sheets

METHOD AND APPARATUS FOR ADJUSTING STEERING FEEL

TECHNICAL FIELD

The present invention is directed to a vehicle steering systems and is particularly directed to a method and apparatus for adjusting a steering feel to (i) warn the driver of the presence of a vehicle in a blind spot, and (ii) warn the driver of a detected driver condition.

BACKGROUND OF THE INVENTION

Power assist steering systems are known in the art. Power assist steering systems that decrease assist as vehicle speed increases are also known. Steering systems that adjust or provide steering assist in response to forces created by side winds are also known.

SUMMARY OF THE INVENTION

A vehicle steering system is provided that warns the driver when a hazardous steering condition exists and/or warns the driver of his inattentiveness.

In accordance with one embodiment of the present invention, a vehicle steering apparatus is provided. The apparatus comprises a steering feel motor operatively connected to a vehicle steering system. Means are provided for sensing a characteristic of a driver and providing a signal indicative thereof. Means are provided for controlling the steering feel motor in response to the driver characteristic signal.

In accordance with another embodiment of the present invention, an apparatus is provided which controls the steering force felt by a driver during a steering maneuver. The apparatus comprises a steering feel motor operatively connected to a vehicle steering system. The apparatus further includes means for sensing a pending steering hazard and providing a signal indicative thereof. Means are included for controlling the steering feel motor in response to the hazard signal.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF PREFERRED EMBODIMENTS

Figure 1:
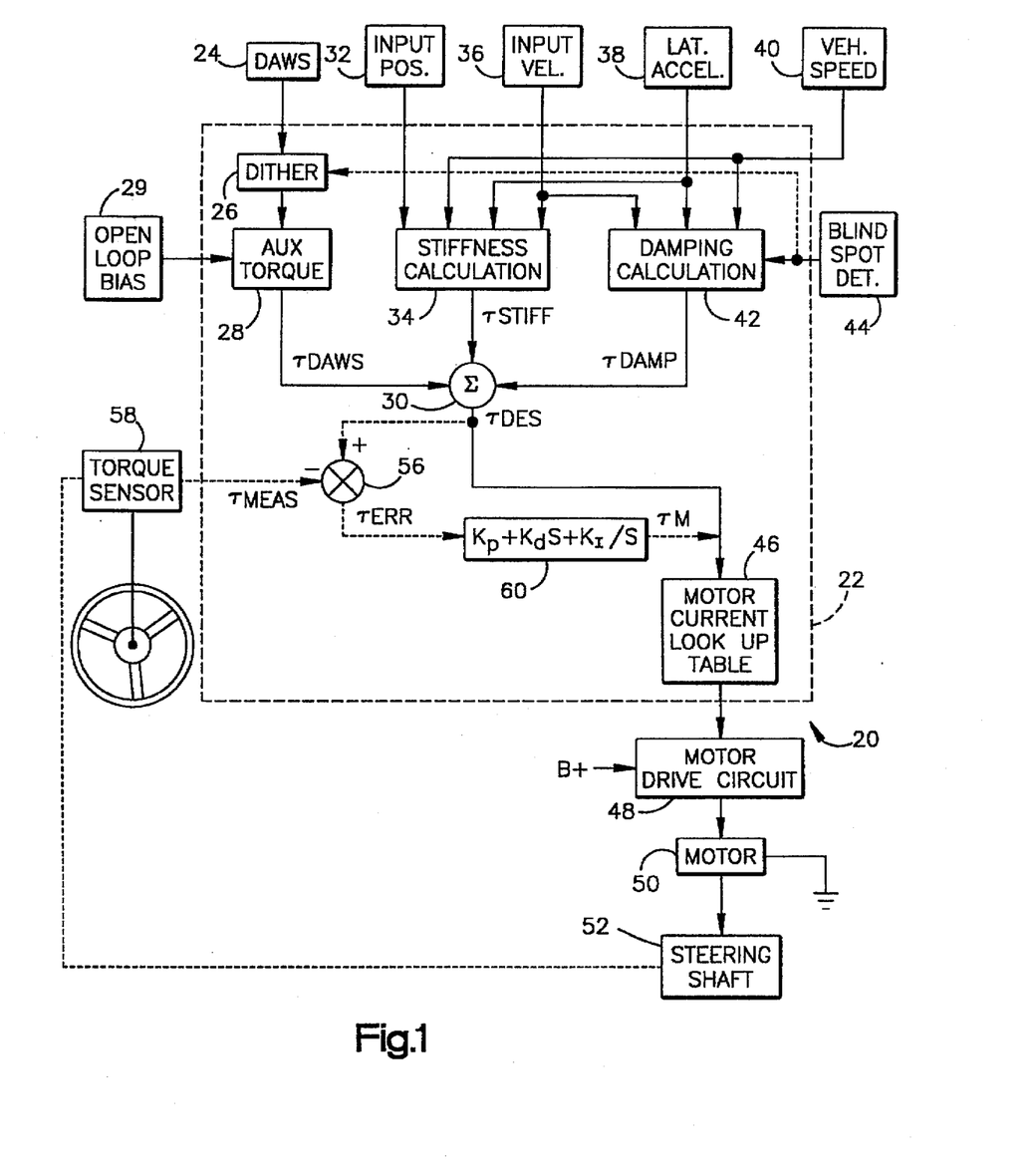
FIG. 1 is a schematic block diagram of a power steering system made in accordance with the present invention.

Referring to FIG. 1, an active vehicle steering system 20 includes a controller 22. The controller 22 is connected to a steering feel motor 50 through a drive circuit 48. The steering feel motor 50 can be a separate motor or can be a power assist motor.

Preferably, controller 22 is a microcomputer having internal memories and timers for timing internal functions. A Driver Alertness Warning System ("DAWS") 24 is electrically connected to a dither function 26 of controller 22. DAWS 24 detects a characteristic of a vehicle driver and provides an electrical signal to dither function 26. For example, driver drowsiness or intoxication may be detected using any one of a number of known systems. Dither function 26 is electrically connected to an auxiliary torque function 28. Auxiliary torque function 28 provides an auxiliary torque signal to a summing function 30. Dither function 26 provides a periodic incremental torque signal which is alternately a positive increment then a negative increment in response to a signal from DAWS 24. A plus or minus incremental torque is provided by auxiliary torque function 28 as the auxiliary torque signal in response to the dither signal.

An open-loop bias 29 is also electrically connected to auxiliary torque function 28. Open-loop bias 29 is a potentiometer mounted, for example, on the vehicle dashboard. Open-loop bias 29 provides a bias torque signal to auxiliary torque function 28. The bias torque signal is selected by the vehicle driver and is used by the vehicle driver to bias out steady state forces which affect vehicle steering, e.g., side wind forces, road crown. These steady state forces can be automatically biased out using a closed-loop control system described below.

A steering input position sensor 32 is electrically connected to a steering stiffness calculation function 34. Steering wheel position, also hereinafter referred to as steering angle, is defined as a positive number for a left turn and a negative number for a right turn. Steering input position sensor 32 provides an electrical signal indicative of steering angle to a stiffness calculation function 34 of controller 22. Any one of a number of known steering wheel position sensors or methods may be used to provide the steering position signal.

A steering input velocity sensor 36 is also electrically connected to stiffness calculation function 34. Steering velocity is defined as a positive number for counterclockwise rotations of the vehicle steering handwheel and a negative number for clockwise rotations of the steering handwheel. Steering input velocity sensor 36 provides an electrical signal indicative of steering velocity to stiffness calculation function 34. Any one of a number of known steering velocity sensors or methods may be used to provide the steering velocity signal.

A lateral acceleration sensor 38 is electrically connected to stiffness calculation function 34. Lateral acceleration sensor 38 provides an electrical signal indicative of vehicle lateral acceleration to stiffness calculation function 34. Any one of a number of known lateral acceleration sensors or methods may be used to provide the lateral acceleration signal.

A vehicle speed sensor 40 is electrically connected to stiffness calculation function 34. Vehicle speed sensor 40 provides an electric signal indicative of vehicle speed to stiffness calculation function 34. Any one of a number of known methods may be used to provide the vehicle speed signal. Stiffness calculation function 34 provides a torque stiffness signal to the summing function 30. The torque stiffness signal, in the present invention, is used to provide a restoring torque.

Figure 2A:
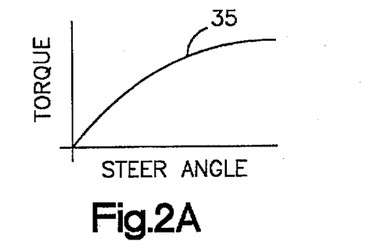
FIGS. 2A-2D are graphical representations of control values used in the present invention shown in FIG. 1.

Referring to FIG. 2A, torque stiffness, as a function of steering angle, is represented by the slope of a line tangent to a non-linear function shown by a line 35. The stiffness restoring torque is similar to the force caused by the spring effect of a torsion bar, upon being twisted, and is generally responsive to the magnitude of a change in steering position. As the magnitude of the change in position increases, the stiffness also increases. A stiffness restoring torque of a torsion bar is generally a linear function. Since the torque stiffness sensed by the driver in the present invention is a function of the torsional properties of the steering shaft and the torque stiffness calculation signal, the relationship between change in steering angle and torque may be non-linear as shown in FIG. 2A. Torque stiffness is sensed by the vehicle driver through the steering system at the handwheel. A low torque stiffness allows the handwheel to spin easily. Torque stiffness calculation function 34 also includes other inputs, i.e., steering input velocity 36, vehicle lateral acceleration 38, and vehicle speed 40.

Figure 2B:
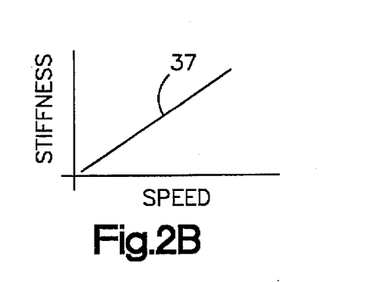

Referring to FIG. 2B, as vehicle speed increases torque stiffness increases as shown by a line 37. At low speeds, e.g. parking the vehicle, it is desirable to have lower stiffness since parking the vehicle and turning corners in city driving require larger steering angle changes. At these low speeds, it is desirable to have the handwheel spin easily. At higher highway speeds, the steering angle changes are normally smaller and it is desirable to resist a freely spinning handwheel to reduce rapid changes in steering angle and excessive vehicle yaw rate.

Figure 2C:
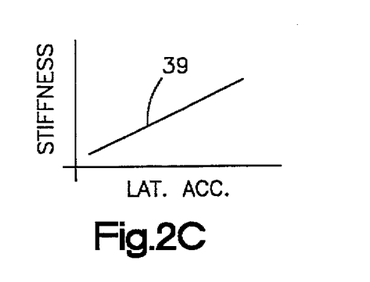

Referring to FIG. 2C, as vehicle lateral acceleration increases, torque stiffness increases, as shown by a line 39, to control vehicle yaw rate. At low speeds, e.g. parking the vehicle, there is little lateral acceleration and it is desirable to allow the handwheel to spin easily. At higher speeds, smaller changes in steering angle cause greater lateral acceleration. Therefore, it is desirable to resist a freely spinning handwheel to prevent excessive vehicle yaw rate.

As the vehicle handwheel is returning to a neutral steering position after a steering maneuver, stiffness calculation function 34 provides a torque stiffness signal which aids in returning the handwheel to a neutral steering position. This return assisting stiffness torque is referred to as "steering recovery bias." Typically, a driver of a vehicle (i) does not completely release the handwheel after executing a turn, and (ii) does not affirmatively steer the handwheel back to the neutral steering position. Since the handwheel does not "free wheel" when returning to the neutral steering position, and the driver does not affirmatively turn back to a neutral position, the driver's hand contacting the handwheel resists the return of the handwheel to the steering neutral position. Consequently, stiffness calculation function 34 increases the apparent stiffness that the driver senses and provides a torque stiffness signal which aids in returning the steering system to a neutral steering position.

Figure 2D:
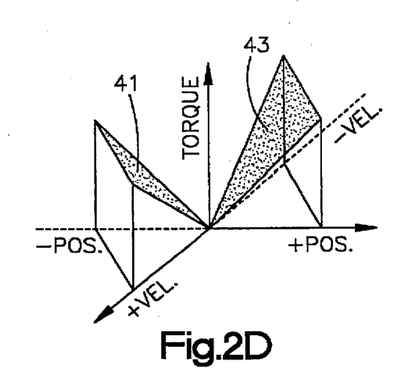

Referring to FIG. 2D, recall the conventions that (i) a positive position number indicates the handwheel is positioned for a left turn and a negative position number indicates the handwheel is positioned for a right turn, and (ii) a positive velocity number indicates counterclockwise rotations of the vehicle handwheel and a negative number indicates clockwise rotations of the handwheel. For example, when the position signal is negative, the steering position is in a right turn maneuver on the left of the origin in FIG. 2D. After completion of the steering maneuver, the handwheel input velocity is positive (+vel) thereby indicating a counterclockwise handwheel rotation returning the handwheel to a neutral steering position. The steering recovery bias torque stiffness is shown by a surface 41 for a right turn with the handwheel returning in a counterclockwise rotation. A surface 43 is for a left turn with the handwheel returning to neutral steering position in a clockwise rotation. Torque stiffness calculation function 34 is implemented using a four dimensional look-up table. The input variables include steering input position, steering input velocity, lateral acceleration, and vehicle speed. The stiffness torque value is determined in accordance with the functions illustrated in FIGS. 2A–2D. One skilled in the art will appreciate that the stiffness calculation function 34 may also be determined using equations instead of look-up tables.

Steering input velocity sensor 36, lateral acceleration sensor 38, and vehicle speed sensor 40 are also electrically connected to a steering damping calculation function 42. Steering damping calculation function 42 is electrically connected to summing function 30. Damping calculation function 42 provides a torque damping signal to summing function 30. The torque damping signal represents a damping force sensed by the vehicle driver through the steering system. The torque damping force resists movement of the steering wheel and is generally responsive to a change in steering input velocity as well as vehicle speed, vehicle lateral acceleration, and blind spot detection signals.

A blind spot detector 44 is electrically connected to damping calculation function 42. A blind spot is that area near the vehicle that a vehicle driver cannot view due to visual obstructions created by the vehicle structure or an area not visible in the vehicle rear view mirror system. Blind spot detector 44 detects (i) the presence of an object near the vehicle and, (ii) the distance the object is from the vehicle. It will be appreciated that detection of the object is not limited to the vehicle blind spot and may include detection of an object adjacent to the vehicle or in the potential path of the vehicle. Blind spot detector is preferably a vehicle radar system capable of detecting and providing signals indicative of (i) the presence of an object, and (ii) the distance between the object and the vehicle.

Figure 3A:
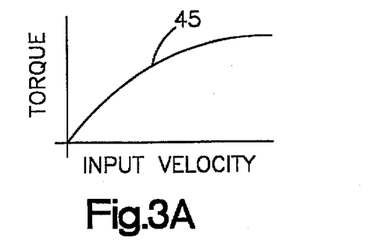
FIGS. 3A-3D are graphical representations of control values used in the present invention shown in FIG. 1; and, FIGS. 4-7 are flow diagrams showing the control process of the present invention for the steering system shown in FIG. 1.

Referring to FIG. 3A, the torque damping signal, in the present invention, provides a damping force to a steering maneuver. The damping force as a function of steering input velocity is represented by the slope of a line tangent to a non-linear function shown by a line 45. The damping force is generally responsive to steering velocity. As the input steering velocity increases the damping also increases. Torque damping is sensed by the vehicle driver through the steering system. A low torque damping force allows the handwheel to spin easily. Torque damping calculation function 42 also includes other inputs such as, vehicle lateral acceleration, vehicle speed, and blind spot detection.

Figure 3B:
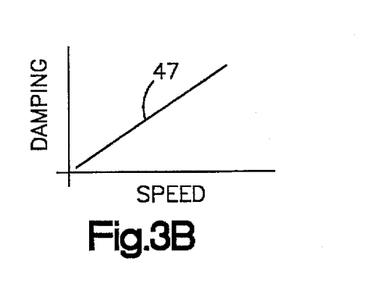

Referring to FIG. 3B, as vehicle speed increases, torque damping increases as shown by a line 47. At low speeds, e.g. parking the vehicle, forces which resist steering are greater and it is desirable to provide less damping. At higher highway speeds, increased torque damping is desired to resist rapid steering position changes causing excessive vehicle yaw rate.

Figure 3C:
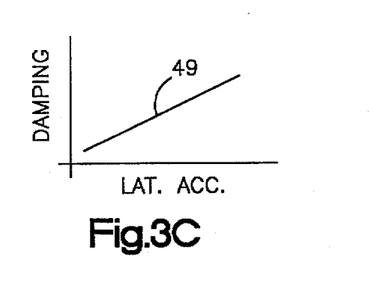

Referring to FIG. 3C, as vehicle lateral acceleration increases, torque damping increases to control vehicle yaw rate as shown by a line 49. At low speeds, e.g. parking the vehicle, there is little lateral acceleration and it is desirable to allow the handwheel to spin easily. At higher lateral acceleration, it is desirable to provide a damping force to resist a freely spinning handwheel and prevent increased vehicle yaw rate.

Figure 3D:
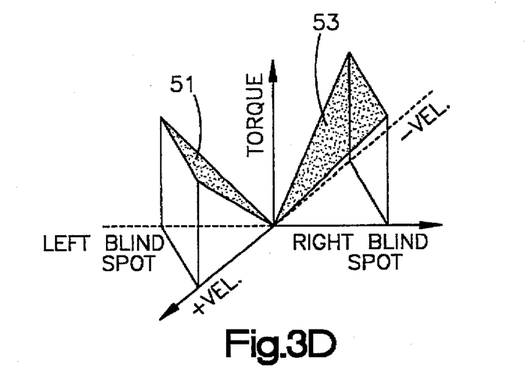

Referring to FIG. 3D, a damping function in response to a signal from blind spot detector 44 is shown. The blind spot axis of FIG. 3D is the inverse distance between the vehicle and the detected object, so the origin of FIG. 3D corresponds to an object far away from the vehicle. A closer object is represented by a point further away from the origin in the appropriate direction, i.e. right or left on the blind spot axis. Recall that a positive steering velocity is counterclockwise rotation of the handwheel corresponding to a left turning maneuver. A negative steering velocity is a clockwise rotation of the handwheel corresponding to a right turning maneuver. A torque damping function, illustrated by a surface 51, is used and when a detected object is to the left of the vehicle when the driver initiates a turning maneuver with a positive steering velocity. A torque damping function illustrated by a surface 53 is used when a detected object is to the right of the vehicle and when the driver initiates a turning maneuver with a negative steering velocity. As the object moves closer to the vehicle and the magnitude of the steering velocity increases, the torque damping increases, thereby resisting the driver's attempt to steer the vehicle into the path of the detected object. The further away the detected object is from the vehicle, the less torque damping.

Torque damping calculation function 42 is preferably implemented using a four dimensional look-up table. The input variables include steering input velocity, lateral acceleration, vehicle speed, and vehicle speed blind spot detection, in accordance with the functions illustrated in FIGS. 3A–3D, to determine the torque damping signal. One skilled in the art will appreciate that the damping calculation function 42 may also be determined using equations instead of look-up tables.

Summing function 30 is electrically connected to a motor current look-up table 46. Summing function 30 sums (i) the auxiliary torque signal, (ii) the torque stiffness signal, and (iii) torque damping signal together to provide a desired torque signal. The desired torque signal is used to select the desired motor current from look-up table 46 and is provided in an open-loop control. One skilled in the art will appreciate that equations may be used to determine the desired motor current instead of a look-up table.

A vehicle handwheel 59 is connected to a steering shaft 52 through a torsion sensor 58. Look-up table 46 is controllably connected to a motor drive circuit 48. Look-up table 46 provides a motor control signal to motor drive circuit 48 in response to the output of summing function 30. Motor drive circuit 48 is electrically connected to a source of electrical power B+ and a steering feel motor 50. Motor drive circuit 48 uses the control signal to control energization of the feel motor 50 in terms of current applied to the motor through a plurality of power switches (not shown) in a known manner. Motor 50 is operatively connected to the vehicle steering shaft 52 which is, in turn, connected to the steerable wheels (not shown) of the vehicle in a known manner.

The steering system has a torque, resulting from normal driving forces, which is sensed by the vehicle driver. Motor 50 provides an additional torque to steering shaft 52, which is sensed by the driver of the vehicle, as an included component in the steering system torque. The additional force applied by motor 50 is provided by selecting appropriate auxiliary torque, torque stiffness, and torque damping components for the desired torque signal. In this manner, the steering system torque provided by the vehicle driver is modified in response to a steering position input in combination with (i) a signal from DAWS function 24 or (ii) a signal from blind spot detector 44. One skilled in the art will appreciate that the torque stiffness and damping signals, in fact, represent torques which are usually in the opposite direction of a torque applied using a conventional power assist steering motor.

In accordance with a preferred closed-loop control embodiment of the present invention, the desired torque signal is used to select the desired motor current from look-up table 46 and is provided in a closed control loop. Summing function 30 provides the desired torque signal as one input to a summing point 56. A torque sensor 58 is electrically connected to a negative input of summing point 56. Torque sensor 58 is operatively connected to the steering system to (i) measure torque applied by the driver to the steering system via the steering handwheel 59, and (ii) outputs a measured torque signal to the negative input of summing point 56. Summing point 56 is electrically connected to a PID control function 60. Summing point 56 provides a torque error signal to PID control function 60. PID control function 60 provides an output torque signal τM to motor current look-up table 46.

The algorithm of closed-loop feedback PID controller 60 detects a steady-state, non-zero torque and automatically biases it out, e.g., side wind forces, road crown.

Referring to FIGS. 4–7, the control process of controller 22 of the present invention will be appreciated. Specifically, in FIG. 4, in step 200, the process starts where initial values are set and memories and timers are reset. The process proceeds to step 202 where controller 22 fetches a steering input position value from input position sensor 32 and provides the position value to stiffness calculation function 34 and damping calculation function 42. In step 204, controller 22 fetches a steering input velocity value from input velocity sensor 36 and provides the steering input velocity value to stiffness calculation function 34 and damping calculation function 42. Next, in step 206, controller 22 fetches a vehicle speed value from speed sensor 40 and provides the vehicle speed value to stiffness calculation function 34 and damping calculation function 42. In step 208, controller 22 fetches a lateral acceleration value from lateral acceleration sensor 36 and provides the value to stiffness calculation function 34 and damping calculation function 42. In step 210, the desired torque signal is determined by summing the outputs from stiffness calculation function 34 and damping calculation function 42 as determined in the four dimensional look-up tables described above in accordance with FIGS. 2A–2D and FIGS. 3A–3C. The process then proceeds to step 212.

Figure 4:
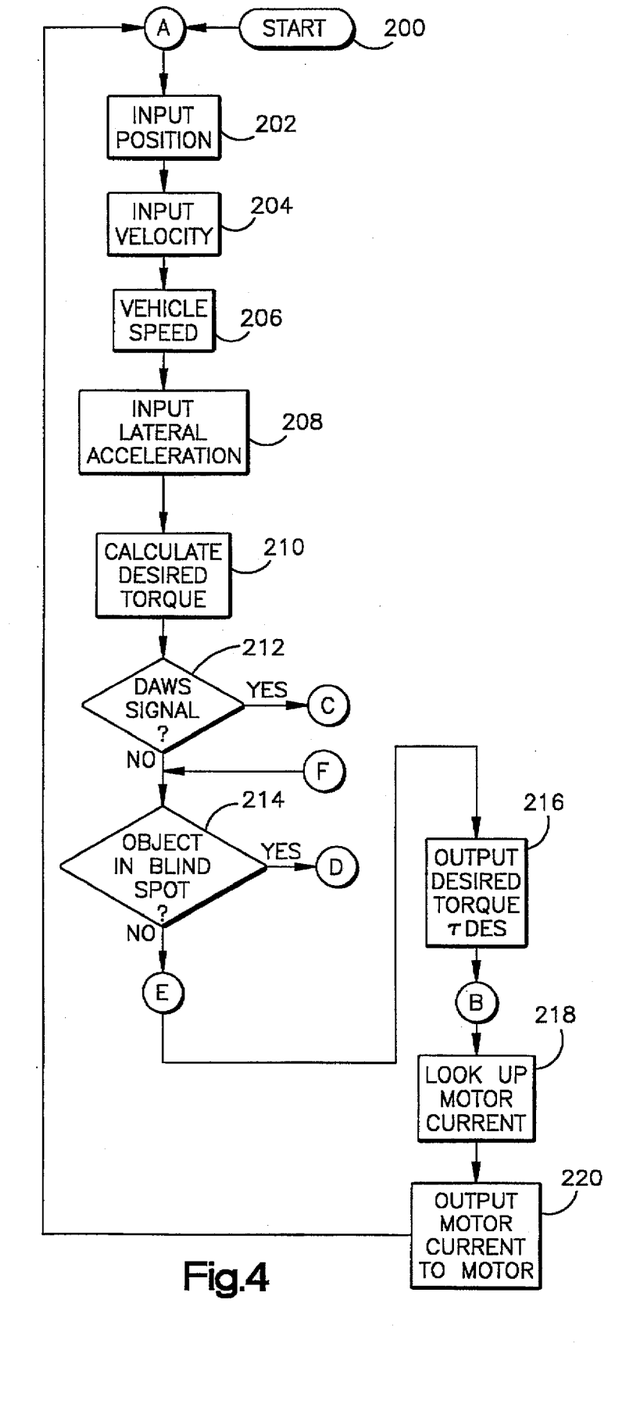

In step 212, a determination is made as to whether a signal is received from Driver Alertness Warning System 24 thereby indicating a driver characteristic requiring a warning signal to be provided to the vehicle driver. If the determination is negative, the process proceeds to step 214. In step 214, a determination is made as to whether an object is detected in a blind spot as described above. If the determination in step 214 is negative, the process proceeds to step 216 where the desired torque signal is output to motor current look-up table 46. In step 218, the motor current for the desired torque is determined in response to sensed steering torque and the desired torque value determined in step 210. Any one of a number of known methods may be used to determine appropriate motor current values for a desired torque value. For example, current values may be empirically determined. The appropriate motor current value is provided to motor drive circuit 48. Next, in step 220, motor drive circuit provides energizing current to motor 50. For example, motor drive circuit may provide a pulse-width-modulated current through a known H-Bridge drive circuit. The process then returns to step 202.

Figure 6:
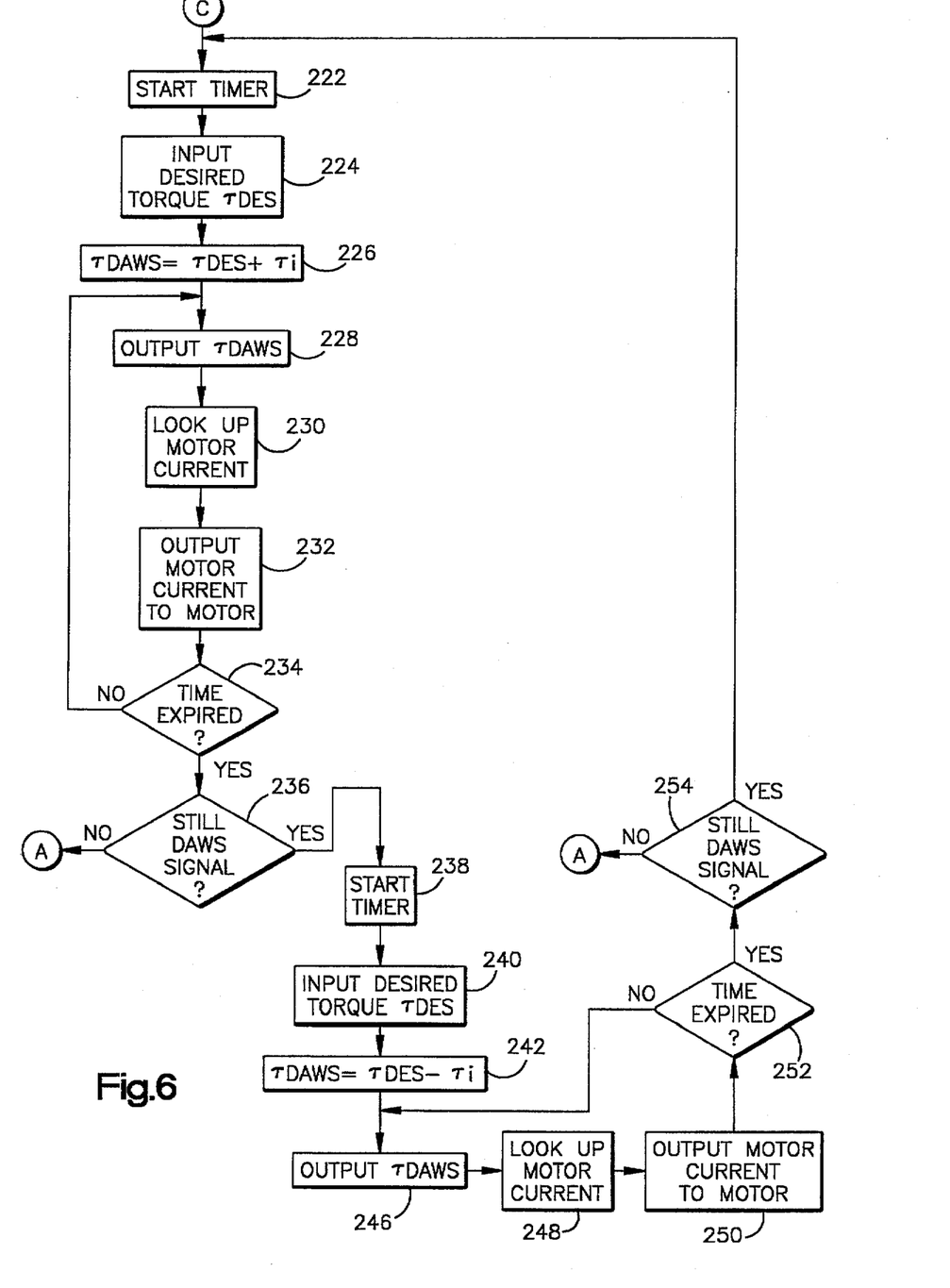

If the determination in step 212 is affirmative, i.e., there is a signal from Driver Alertness Warning System 24 indicating, for example, a drowsy driver, the process proceeds to step 222 in FIG. 6 where the auxiliary torque signal is determined in auxiliary torque function 28. In step 222, a DAWS torque increment timer, internal to the microcomputer, is started. In step 224, the desired torque from step 210 is input. The desired torque signal in step 210 is determined in response to input steering position, input steering velocity, vehicle lateral acceleration, and vehicle speed, thereby producing a base desired torque signal. In step 226, the DAWS torque is determined by adding an incremental torque component to the base desired torque signal. The magnitude of the incremental torque is empirically determined and is chosen to provide a noticeable torque dither felt by the driver in the handwheel. In step 228, the DAWS torque is output to motor current look-up table 46. In step 230, the motor current look-up table provides the motor current for the DAWS torque. Next, in step 232, the appropriate motor current value is provided to motor drive circuit 48.

In step 234, a determination is made as to whether the timer set in step 222 has timed out. If the determination in step 234 is negative, indicating that a predetermined time period has not yet elapsed, the process returns to step 228. The length of the predetermined time period is empirically determined to provide a noticeable torque dither to be felt by the driver of the vehicle in the handwheel. If the determination in step 234 is affirmative, that the predetermined time period has expired, the process proceeds to step 236. In step 236, a determination is made as to whether a DAWS signal is still present from DAWS sensor 24. If the determination in step 236 is negative, the process returns to step 202 in FIG. 1. If the determination in step 236 is affirmative, i.e., a DAWS signal is still present, the process proceeds to step 238.

In step 238, the DAWS torque increment timer is started. In step 240, the desired torque from step 210 is input. In step 242, the DAWS torque is determined by subtracting an incremental torque component to the desired torque. The magnitude of the incremental torque to be subtracted is empirically determined and is chosen to provide a noticeable torque dither felt by the driver in the handwheel. In step 246, the DAWS torque is output to motor current look-up table 46. In step 248, the motor current look-up table provides the motor current for the DAWS torque. Next, in step 250, the appropriate motor current value is provided to motor drive circuit 48. In step 252, a determination is made as to whether the timer set in step 238 has timed out. If the determination in step 252 is negative, indicating that a predetermined time period has not yet elapsed, the process returns to step 246. The length of the predetermined time period is also empirically determined to provide a noticeable torque dither to be felt by the driver of the vehicle in the handwheel.

If the determination in step 252 is affirmative, indicating that the predetermined time period has expired, the process proceeds to step 254. In step 254, a determination is made as to whether a DAWS signal is still present from DAWS sensor 24. If the determination in step 254 is negative, the process returns to step 202 in FIG. 1. If the determination in step 254 is affirmative, i.e., a DAWS signal is still present, the process returns to step 222. The torque dither provided by auxiliary torque function 28 in response to a DAWS signal provides a vibration in the handwheel alerting the driver to his condition as detected by the DAWS circuit.

Figure 7:
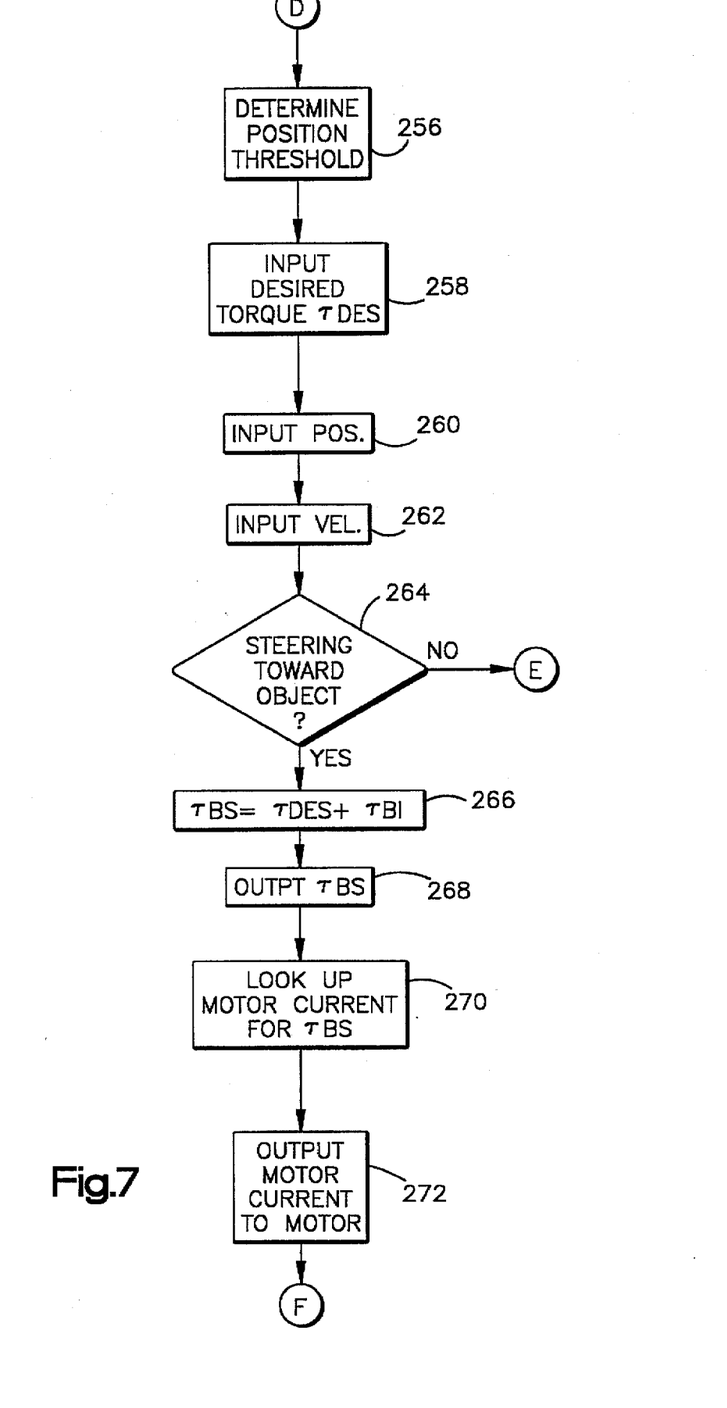

Returning to FIG. 1, if the determination in step 214 is affirmative, indicating the presence of an object in a blind spot of the vehicle and in a potential path of the vehicle, the process proceeds to step 256 in FIG. 7.

Referring to FIG. 7, in step 256, a threshold steering position is determined. For an object detected in a left blind spot area, the threshold position is near the neutral steering position but slightly right of neutral. Therefore, the threshold position has a negative position value as described in the conventions above. For an object detected in a right blind spot area, the threshold position is near the neutral steering position but slightly left of the neutral steering position. Therefore, the threshold position has a positive position value as described in the conventions above.

In step 258, the desired torque from step 210 is input. Recall that the desired torque signal in step 210 is determined in response to input steering position, input steering velocity, vehicle lateral acceleration, and vehicle speed, thereby producing a base desired torque signal. In step 260, the steering position is fetched from position sensor 32 by damping calculation function 42. In step 262, the input steering velocity is fetched by damping calculation function 42. The process then proceeds to step 264, where a determination is made as to whether the driver is steering toward the detected object. If the determination in step 264 is negative, the process returns to step 216 in FIG. 4. For an object in a left blind spot and negative position threshold, the vehicle is turning toward the object if (i) the present input position is greater than the negative threshold position, i.e. less negative or positive, thereby indicating a left turn, and (ii) an input steering velocity greater than zero indicating counterclockwise rotation of the handwheel. If both conditions (i) and (ii) above are satisfied, the determination in step 264 is affirmative, thereby indicating that the driver is turning toward the object in the left blind spot and the process proceeds to step 266. In step 266, the torque blind spot signal τBS is determined by adding a blind spot torque increment τBI to the desired torque signal. The value of the τBS signal is determined from FIG. 3D as described above. The incremental torque value τBS is not large enough to overpower the driver. In step 268, the τBS torque is output to motor current look-up table 46. In step 270, the motor current look-up table provides the motor current for the τBS torque. Next, in step 272, the appropriate motor current value is provided to motor drive circuit 48.

Figure 5:
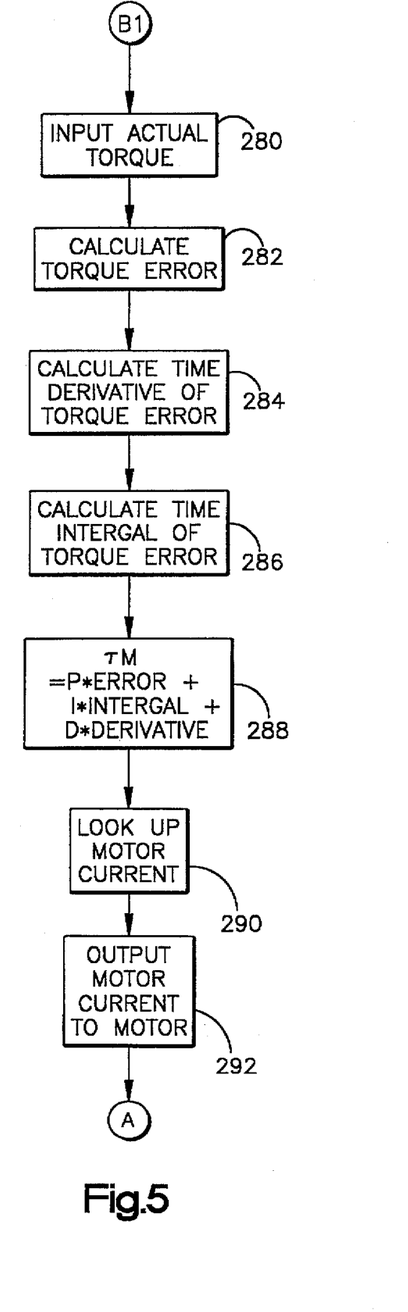

As described above in FIG. 1, a preferred embodiment of the present invention includes a closed-loop torque feedback loop using a Proportional Integral Derivative (PID) controller. Referring to FIG. 5, the control process of the closed-loop system will be appreciated. After step 216 in FIG. 4 the process proceeds to step 280 in FIG. 5. In step 280, the actual measured torque (τMEAS) applied by the driver is sensed by torque sensor 58 and is provided to summing point 56. In step 282, the torque error is determined in summing point 56 by subtracting the measured torque signal from the desired torque signal. In step 284, the time derivative of the error signal is determined. Next, in step 286, the time integral of the torque error signal is determined. The process then proceeds to step 288 where PID controller 60 determines an output torque τM and the τM torque is output to motor current look-up table 46. In step 290, the motor current look-up table provides the motor current for the τM torque. Next, in step 292, the appropriate motor current value is provided to motor drive circuit 48.

From the above description of the invention, those skilled in the art will perceive improvements, changes and modifications. Such improvements, changes and modifications within the skill of the art are intended to be covered by the appended claims.

Having described the invention, the following is claimed:

1. A vehicle steering apparatus, said apparatus comprising:

a steering feel motor operatively connected to a vehicle steering system;

means for sensing a characteristic of a driver and providing a signal indicative thereof; and means for controlling said steering feel motor in response to said driver characteristic signal.

2. The apparatus of claim 1 wherein said means for controlling said motor includes means for dithering said motor.

3. A vehicle steering apparatus, said apparatus comprising:

a steering feel motor operatively connected to a vehicle steering system;

means for sensing a pending steering hazard and providing a signal indicative thereof; and means for controlling said motor in response to said hazard signal.

4. The apparatus of claim 3 wherein said hazard sensing means includes means for sensing an object in the potential path of the vehicle.

5. The apparatus of claim 3 wherein said hazard sensing means includes means for sensing an object in a blind spot of said vehicle.

6. The apparatus of claim 3 further including means for further controlling said feel motor in response to road conditions.

7. The apparatus of claim 6 wherein said control means is open-loop controlled.

8. The apparatus of claim 6 wherein said control means is closed-loop controlled.

9. The apparatus of claim 3 further including means for sensing dynamic vehicle forces and wherein said control means includes means for controlling said motor in response to said sensed dynamic forces.

10. A method for controlling a vehicle steering apparatus, said method comprising the steps of:

providing a steering feel motor operatively connected to a vehicle steering system;

sensing a characteristic of a driver and providing a signal indicative thereof; and controlling said steering feel motor in response to said driver characteristic signal.

11. A method for controlling a vehicle steering apparatus, said method comprising the steps of:

providing a steering feel motor operatively connected to a vehicle steering system;

sensing a pending steering hazard and providing a signal indicative thereof; and controlling said steering feel motor in response to said hazard signal.

* * * * *